(12) United States Patent
Furst

(10) Patent No.: US 7,676,191 B2
(45) Date of Patent: Mar. 9, 2010

(54) METHOD OF DUPLEX PRINTING ON SHEET MEDIA

(75) Inventor: Michael R. Furst, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 11/714,016

(22) Filed: Mar. 5, 2007

(65) Prior Publication Data

US 2008/0219719 A1    Sep. 11, 2008

(51) Int. Cl.
 *G03G 15/00*    (2006.01)
(52) U.S. Cl. ...................... 399/401; 399/364; 271/186; 271/291
(58) Field of Classification Search .................. 399/401; 271/186, 291
See application file for complete search history.

(56) References Cited

U.S. PATENT DOCUMENTS

| | | | |
|---|---|---|---|
| 4,019,435 A | 4/1977 | Davis | |
| 4,579,446 A | 4/1986 | Fujino et al. | |
| 4,587,532 A | 5/1986 | Asano | |
| 4,836,119 A | 6/1989 | Siraco et al. | |
| 4,909,374 A | 3/1990 | Skrypalle | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |

(Continued)

FOREIGN PATENT DOCUMENTS

EP    1 612 051 A1    1/2006

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Ren Yan
*Assistant Examiner*—Matthew G Marini
(74) *Attorney, Agent, or Firm*—Fay Sharpe LLP

(57) ABSTRACT

A first and second printing engine are disposed with an intermediate transport belt in U-shaped arrangement. The method employs printing sheets serially on one side in the first engine inverting the sheet and transporting the sheets through about 180° change in direction without rotation. The commonality of the leading edge is thus maintained before and after inverting. The sheet is then fed to the second engine for duplex printing on the second side of the sheet. The second engine may have a media sheet input rotation for simplex printing serially with the duplex printing.

6 Claims, 2 Drawing Sheets

U.S. PATENT DOCUMENTS

| | | | |
|---|---|---|---|
| 5,710,968 | A | 1/1998 | Clark et al. |
| 5,778,377 | A | 7/1998 | Marlin et al. |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,195,151 | B1 | 2/2001 | Parthasarathy et al. |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 6,973,286 | B2 | 12/2005 | Mandel et al. |
| 7,024,152 | B2 | 4/2006 | Lofthus et al. |
| 7,123,873 | B2 | 10/2006 | deJong et al. |
| 7,162,172 | B2 | 1/2007 | Grace et al. |
| 7,188,929 | B2 | 3/2007 | Lofthus et al. |
| 2002/0078012 | A1 | 6/2002 | Ryan et al. |
| 2002/0103559 | A1 | 8/2002 | Gartstein |
| 2002/0141805 | A1 | 10/2002 | Bobrow et al. |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2006/0066885 | A1 | 3/2006 | Anderson et al. |
| 2006/0067756 | A1 | 3/2006 | Anderson et al. |
| 2006/0067757 | A1 | 3/2006 | Anderson et al. |
| 2006/0114313 | A1 | 6/2006 | Moore |
| 2006/0114497 | A1 | 6/2006 | Anderson et al. |
| 2006/0115287 | A1 | 6/2006 | Roof |
| 2006/0115288 | A1 | 6/2006 | Roof |
| 2006/0132815 | A1 | 6/2006 | Lofthus et al. |
| 2006/0176336 | A1 | 8/2006 | Moore et al. |
| 2006/0197966 | A1 | 9/2006 | Viturro et al. |
| 2006/0209101 | A1 | 9/2006 | Mizes |
| 2006/0214359 | A1 | 9/2006 | Clark |
| 2006/0214364 | A1 | 9/2006 | Clark et al. |
| 2006/0215240 | A1 | 9/2006 | Mongeon |
| 2006/0221159 | A1 | 10/2006 | Moore et al. |
| 2006/0221362 | A1 | 10/2006 | Julien et al. |
| 2006/0222378 | A1 | 10/2006 | Julien |
| 2006/0222384 | A1 | 10/2006 | Moore et al. |
| 2006/0222393 | A1 | 10/2006 | de Jong et al. |
| 2006/0227350 | A1 | 10/2006 | Crawford et al. |
| 2006/0230201 | A1 | 10/2006 | Fromherz et al. |
| 2006/0230403 | A1 | 10/2006 | Crawford et al. |
| 2006/0233569 | A1 | 10/2006 | Furst et al. |
| 2006/0235547 | A1 | 10/2006 | Hindi et al. |
| 2006/0238778 | A1 | 10/2006 | Mongeon et al. |
| 2006/0244980 | A1 | 11/2006 | Grace |
| 2006/0250636 | A1 | 11/2006 | Richards |
| 2006/0268317 | A1 | 11/2006 | Lofthus et al. |
| 2006/0268318 | A1 | 11/2006 | Lofthus et al. |
| 2006/0269310 | A1 | 11/2006 | German et al. |
| 2006/0274334 | A1 | 12/2006 | Mongeon |
| 2006/0274337 | A1 | 12/2006 | Dalal et al. |
| 2006/0280517 | A1 | 12/2006 | Roof et al. |
| 2006/0285159 | A1 | 12/2006 | Frankel |
| 2006/0285857 | A1 | 12/2006 | Swift |
| 2006/0291018 | A1 | 12/2006 | Lang et al. |
| 2007/0002085 | A1 | 1/2007 | Sampath et al. |
| 2007/0002344 | A1 | 1/2007 | Klassen |
| 2007/0002403 | A1 | 1/2007 | Klassen |
| 2007/0024894 | A1 | 2/2007 | Moore et al. |
| 2007/0031170 | A1 | 2/2007 | deJong et al. |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.

U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
European Search Report for EP 08 15 1699; dated Jun. 5, 2008; Munich, Germany and Annex to the European Search Report/Opinion.

METHOD OF DUPLEX PRINTING ON SHEET MEDIA

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. 20031468-US-NP, Published Sep. 28, 2006, entitled "IMAGE QUALITY CONTROL METHOD AND APPARATUS FOR MULTIPLE MARKING ENGINE SYSTEMS," by Michael C. Mongeon;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/189,371, filed Jul. 26, 2005, entitled "PRINTING SYSTEM," by Steven R. Moore, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen; and, U.S. application Ser. No. 11/359,065, filed Feb. 22, 2005, entitled "MULTI-MARKING ENGINE PRINTING PLATFORM", by Martin E. Banton.

BACKGROUND

In automatic copying and printing with electrostatic or xerographic techniques, where printing of an image on both sides of the print media sheet has been required, it is necessary to invert the sheet by reversing the sheet with respect to the leading and trailing edge in the direction of feed after printing on one side. This results in what was originally the leading edge with respect to the direction of feed now becoming the trailing edge. Typically such copying machines register against the leading edge of the sheet for positioning the sheet during printing of the first side. Inverting the sheet to present an opposite edge as the leading edge for registration introduces error in locating the image on the second side of the sheet with respect to the image printed on the first side. Where the pages are to be bound or placed in a notebook the misorientation of the printed image on opposite sides is quite noticeable to the reader upon turning the pages and is considered to be unacceptable printing quality.

In an office or enterprise printing arrangement, duplex printing may be accomplished by employing two common printing engines, with the output of the first, after being inverted, feeding into the second identical printing engine. This type arrangement permits serial duplex printing or parallel dual simplex printing by an operator separately feeding sheet stacks to each printing engine individually. However, this does not permit continuity in scheduling print jobs. Thus, it has been desired to provide a way or means of enabling automatic electrostatic duplex printing in a manner which eliminates the registration errors associated with positioning the image on the opposite side with respect to opposite edges of the print sheet media. It has further been desired to permit scheduling duplex and simplex printing continuously on equipment utilizing plural identical printing engines.

BRIEF DESCRIPTION

The method described and illustrated in the present disclosure addresses the above-described problem by arranging duplicate automatic electrostatic printing engines for print media sheets to travel in a U-shaped path with respect to transport between the first and second printing engine. The method of the present disclosure thus provides for maintaining the identity of the leading edge with respect to the direction of feed as it is fed serially into the first engine, printed upon one side of the sheet and fed into the second engine for printing on the opposite side of the sheet. This arrangement thus provides for registering on a common edge of the sheet for positioning the image to be printed on both sides of the sheet thereby eliminating error in registration of the images on the opposite sides of the sheet.

The method of the present disclosure utilizes a transfer belt arrangement which moves the sheet from the output of the first printing engine through a change in direction of movement of about 180°, without rotating the sheet stock, to preserve the identity of the leading edge of the sheet stock with respect to feed into the printing engines. In the exemplary embodiment illustrated, the sheet stock is transported through a first quarter turn, transported linearly to a second quarter turn and then fed into the second printing engine.

DETAILED DESCRIPTION

Figure 1:
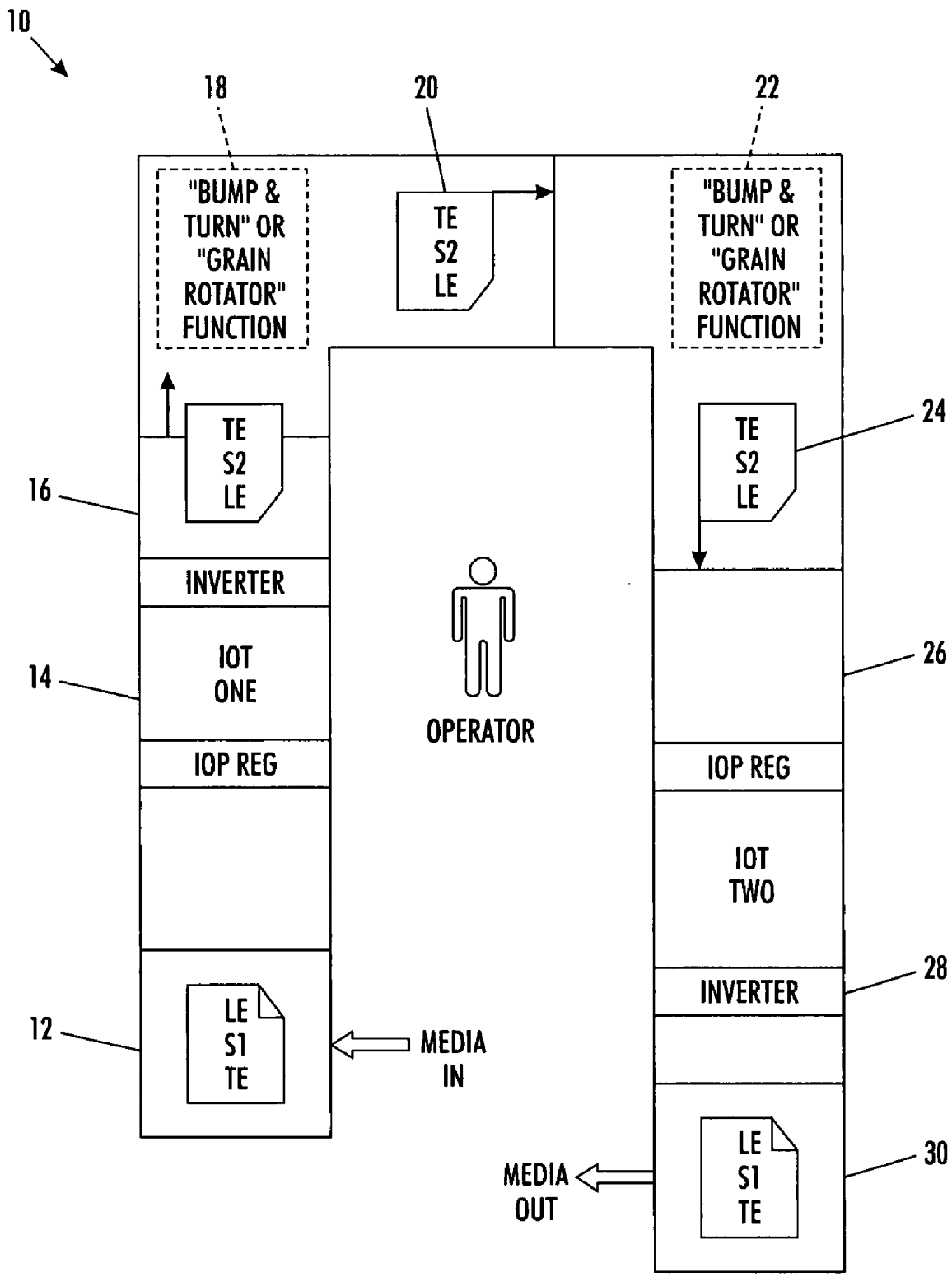
FIG. 1 is a pictorial schematic of the first exemplary embodiment of the method of the present disclosure.

Referring to FIG. 1, an equipment arrangement for practicing the method of the present disclosure is indicated generally at 10 and includes a first print media sheet input station 12 which may include a sheet stack tray and feeder as well known in the art. The print media sheets are stacked so as to be fed for printing on one side, indicated by the reference character S1 in FIG. 1, and with a leading edge of each sheet identified by the reference character LE. The sheets from the feeder 12 are inputted to a first printing engine 14 for printing on side S1; and, upon completion of the printing on side S1, the sheets are inverted at station 16 so as to be prepared for printing on the opposite side indicated by the reference character S2 in FIG. 1. The sheets are moved in the direction shown by the black arrow with the trailing edge TE now in the lead. The sheets to be printed on side S2 are then transported to a turning station 18 which effects a quarter turn or about 90° turn without rotation of the sheets such that the trailing edge and leading edge are now disposed at right angles to the direction of movement.

The sheets are then transported linearly in the direction of the black arrow as identified at station 20 and are processed through a second quarter turn, or about 90° of turn, in direction of movement without rotation of the sheet. This results in the orientation of the sheet indicated by reference numeral 24 where the original leading edge LE is now returned to the leading position. The sheet is then transported and fed to the input of a second printing engine 26, which prints on the second side S2 of the sheet. The second engine, which may be identical to the first engine 14, then (optionally) passes the sheet through a second inverter 28 and out to a stack processor such as a collator or other sheet arrangement receptacle as denoted by reference numeral 30.

Thus, it will be seen with reference to FIG. 1 that duplex printing of sheet media on both sides thereof is effected by serially feeding into a first and second printing engine while maintaining registration for image positioning purposes on the sheet against a common edge of the sheet irrespective of the inverting of the sheet toward printing on the opposite side thereof. The sheet is thus transported through a U-turn or about a 180° turn while maintaining the orientation of the paper with respect to the stationary printing engines.

Figure 2:
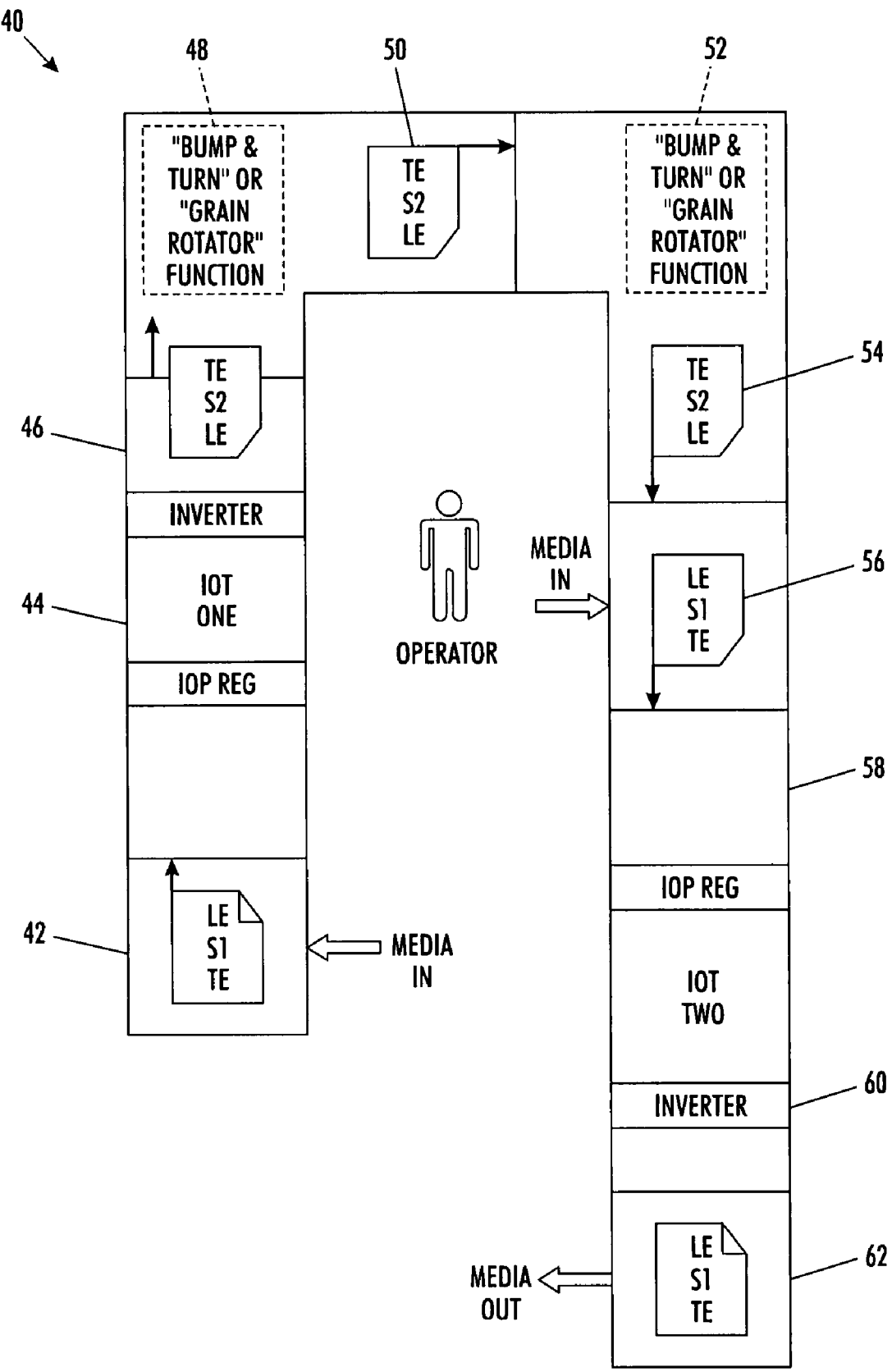
FIG. 2 is a view similar to FIG. 1 of a second exemplary embodiment of the method of the present disclosure.

Referring to FIG. 2, a second exemplary embodiment of the method of the present disclosure is illustrated where the printing equipment is arranged in a generally U-shaped array as indicated generally at 40 and has a media sheet input station 42 which may also be a tray or feed stack feeder device for inputting the sheets serially to a print engine indicated at 44. The sheets are inputted in station 42 with the leading edge, denoted LE, oriented for entering the printing engine 44 and serving as the registration surface therein for locating the image on the sheet for printing one side thereof indicated by the reference character S1 in FIG. 2.

Upon completion of printing on the side S1, the sheets are serially fed to an inverter 46 which inverts the sheet with the second side S2 displayed upwardly for subsequent printing thereon; and, the leading edge LE is now in the position of trailing with respect to the direction of movement indicated by the arrow in FIG. 2.

The sheet is transported from the inverter 46 to a turn station 48 where the sheet undergoes a quarter turn or, about a 90° turn, and subsequent transport linearly to the station 50. With reference to FIG. 2, the sheet is orientated at station 50 with the leading edge TE and trailing edge LE disposed at right angles to the direction of movement indicated by the black arrow at station 50.

The system then transports the sheets from station 50 to a turn station 52 where the sheets undergo a second quarter turn, or about 90° turn, so that the sheet is moved to station 54 with the orientation remaining unchanged such that the leading edge LE is now in the position of leading. The sheet is then transported through a second media sheet loading station 56 and fed into the input of a second printing engine 58 which may be identical to the first engine 44 for printing on the side S2 of the sheet. The sheet is then fed through a second inverter 60 and out of the second printing engine onto a media sheet receptacle 62 which may be, for example, a collating apparatus.

If it is desired, while scheduling the print job for the duplex printing of the sheets entering engine 58 from engine 44, the job may be scheduled such that the duplex printing is interrupted and sheets are fed from media station 56 into the second printing engine 58 for a simplex printing; and, the duplex printing of the sheets from station 54 continued thereafter. The arrangement of FIG. 2 thus enables two identical printing engines 44, 58 to be employed for ready access by a single operator and may provide for continuous duplex and simplex printing. The arrangement of FIG. 2 maintains the orientation of the sheet media with respect to having a common edge of the sheet enter the first and second printer for registration purposes in locating the image on the surface of the sheet and thus reduces errors of image location in duplex printing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of duplex printing on sheet media comprising:
   (a) feeding media sheets serially into a first printing device with an edge inserted into the printing device first comprising a leading edge and the edge entering the printing device last being a trailing edge;

(b) registering on the leading edge and printing an image on a first side of the sheets such that the sheet emerging from the printing device contains an image on the first side but an image is not placed on an opposite second side of the sheet;

(c) inverting the sheets such that the trailing edge faces the direction of motion and the first side is flipped over, and then feeding the sheet serially out of the device in a direction with the leading edges trailing;

(d) transporting the sheets through a change in direction of about 90 degree without rotation of the sheets such that the leading edge and the trailing edge are currently oriented perpendicular to the direction of motion;

(e) transporting the sheets in a sideways translation motion such that the sheets move in a manner where both the leading edge and the trailing edge are oriented perpendicular to the direction of motion;

(f) transporting the sheets through a change in direction of about 90 degree without rotation of the sheets such that the leading edge is again leading by currently being oriented toward the direction of motion;

(g) feeding the sheets into a second printing device and registering on the leading edge and printing on the side opposite the one side h) inverting the sheets after printing in the second device such that the first side is facing the direction that the second side was previously facing and the trailing edge is currently facing toward the direction of motion; and i) feeding the sheets out.

2. The device defined in claim 1, further comprising feeding additional media sheets into said second printing device serially with the sheets from the first printing device and simplex printing the additional sheets in the second device.

3. The method of claim 1, wherein the first printing device and the second printing device are of the same type.

4. The method of claim 1, wherein the first printing device and the second printing device are of different types.

5. A method of duplex digital printing on sheet media comprising:

(a) feeding print media sheets serially into a first printing device with an edge inserted into the printing device first comprising a leading edge and the edge entering the printing device last being a trailing edge leading in the direction of feed;

(b) registering on the leading edge of the sheets and printing an image on a first side of the sheets such that the sheet emerging from the printing device contains an image on the first side but an image is not placed on an opposite second side of the sheet;

(c) inverting the sheets such that the trailing edge faces the direction of motion and the first side is flipped over, and feeding the sheets out of the device with the leading edge trailing;

(d) changing the direction of transporting the sheets by about 90 degree without rotation of the sheets;

(e) transporting the sheets wherein a trailing edge is currently oriented perpendicular to the direction of motion;

(f) changing the direction of the sheets by about 90 degree without rotation of the sheets such that the leading edge is again leading by currently being oriented toward the direction of motion;

g) feeding the sheets serially into a second printing device and registering on the leading edge and printing an image on the side opposite said one side;

h) inverting the sheets after printing in the second device such that the first side is facing the direction that the second side was previously facing and the trailing edge is currently facing toward the direction of motion; and i) feeding the sheets out.

6. The method defined in claim 5, further comprising feeding additional print media sheets serially into the second device and simplex printing the additional sheets.

* * * * *